US008125598B2

(12) United States Patent
Jung et al.

(10) Patent No.: US 8,125,598 B2
(45) Date of Patent: Feb. 28, 2012

(54) METHOD OF FORMING AN ALIGNMENT LAYER, AND APPARATUS FOR FORMING THE ALIGNMENT LAYER

(75) Inventors: Jin-Soo Jung, Goyang-si (KR); Nak-Cho Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 428 days.

(21) Appl. No.: 12/486,083

(22) Filed: Jun. 17, 2009

(65) Prior Publication Data

US 2010/0035190 A1 Feb. 11, 2010

(30) Foreign Application Priority Data

Aug. 6, 2008 (KR) .......................... 10-2008-0076899

(51) Int. Cl.
G02F 1/1337 (2006.01)
G02F 1/1335 (2006.01)
(52) U.S. Cl. ............. 349/123; 349/129; 349/130; 349/9
(58) Field of Classification Search .................. 349/123, 349/129, 130, 9
See application file for complete search history.

(56) References Cited

U.S. PATENT DOCUMENTS

| 5,909,265 A * | 6/1999 | Kim et al. ..................... 349/129 |
| 6,462,797 B1 * | 10/2002 | Woo et al. ..................... 349/124 |
| 6,751,003 B2 * | 6/2004 | Mi ................................. 359/247 |

FOREIGN PATENT DOCUMENTS

| JP | 2003-043492 A | 2/2003 |
| KR | 1998-0071681 A | 10/1998 |
| KR | 1020010037225 A | 5/2001 |
| KR | 100304914 B1 | 7/2001 |
| KR | 1020030089919 A | 11/2003 |

* cited by examiner

Primary Examiner — Mike Qi (74) Attorney, Agent, or Firm — Cantor Colburn LLP (57) ABSTRACT

A method of forming an alignment layer includes; providing a substrate having a base substrate and a photosensitive polymer layer disposed on the base substrate, the base substrate including a plurality of unit pixel areas, each of which is divided into a plurality of sub-pixel areas, photoaligning the photosensitive polymer layer by irradiating first light to a first exposure area of a first unit pixel area, the first light being inclined at a first angle with respect to the substrate in a first direction, and substantially simultaneously photoaligning the photosensitive polymer layer by irradiating second light to a second exposure area of a second unit pixel area at substantially the same time as the first light is irradiated to the first exposure area, the second light being inclined at a second angle with respect to the substrate in a second direction.

19 Claims, 10 Drawing Sheets

METHOD OF FORMING AN ALIGNMENT LAYER, AND APPARATUS FOR FORMING THE ALIGNMENT LAYER

This application claims priority to Korean patent application No. 2008-76899, filed on Aug. 6, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a method of forming an alignment layer, and an apparatus for forming the alignment layer. More particularly, exemplary embodiments of the present invention relate to a method of forming an alignment layer capable of reducing the number of steps of a photoalignment process for forming a multi-domain structure, and an apparatus for forming the alignment layer.

2. Description of the Related Art

A liquid crystal display ("LCD") apparatus is one of the most widely used types of flat panel display apparatuses. The LCD apparatus includes two display substrates, a liquid crystal layer interposed between the two display substrates and a polarization member disposed on the outside of the display substrates. Each of the display substrates includes an electric field generating electrode such as a pixel electrode, a common electrode, etc.

The LCD apparatus may have a problem of a narrow viewing angle. In order to increase the viewing angle of the LCD apparatus, a multi-domain liquid crystal cell has been developed. Main viewing angles of pixels in the multi-domain liquid crystal cell are different from each other in order to increase the viewing angle.

In order to form the multi-domain liquid crystal cell, a method of forming a slit in the electric field generating electrode or a method of forming a protrusion on the electric field generating electrode has been devised.

However, the slit or the protrusion formed in/on the electric field generating electrode may reduce the optical transmissivity of the pixel. Therefore, in order to form the multi-domain liquid crystal cell without the slit or the protrusion, a method of forming an alignment layer having multiple alignment directions has been developed. For example, an alignment layer including polyimide is coated on a substrate, and a mono-domain structure is formed on the substrate by rubbing the entire substrate. Then, a first domain is rubbed in the opposite direction while a second domain is blocked with photoresist, so that a multi-domain structure is formed having a first domain with an alignment orientation corresponding to the rubbing in the opposite direction and a second domain retaining the alignment orientation corresponding to the original mono-domain structure.

However, there is a problem with the liquid crystal cell manufactured by the above-mentioned method in that dust or static electricity generated during the rubbing process may damage the liquid crystal cell, and thus a manufacturing yield may be reduced.

In order to solve the problem of the rubbing process, a method of photoalignment using an ultraviolet light instead of the rubbing process has been proposed. In the method of the photoalignment, a mask having a transmission portion and a blocking portion in a predetermined pattern is disposed over a substrate and an ultraviolet light is irradiated onto the substrate to form a pretilt at an alignment layer.

When four domains are formed by a conventional photoalignment method, at least four processes for the photoalignment are required. When the combination of an upper substrate and a lower substrate, each having a multi-domain alignment layer, is considered, at least eight processes for the photoalignment are required. When the steps of the photoalignment process are increased, it is necessary to additionally readjust a gap between a mask and a substrate. Further, various errors may occur in the alignment of the mask, and thus productivity may be reduced.

BRIEF SUMMARY OF THE INVENTION

Exemplary embodiments of the present invention provide a method of forming an alignment layer using a simplified process.

Further, exemplary embodiments of the present invention provide a method of manufacturing a liquid crystal display ("LCD") apparatus using the exemplary embodiment of a method of forming the alignment layer.

Still further, exemplary embodiments of the present invention provide an apparatus for forming the alignment layer using the exemplary embodiment of a method of forming the alignment layer.

In accordance with one exemplary embodiment of the present invention, a method of forming an alignment layer includes; providing a substrate having a base substrate and a photosensitive polymer layer disposed on the base substrate, the base substrate including a plurality of unit pixel areas, each of which is divided into a plurality of sub-pixel areas, photoaligning the photosensitive polymer layer by irradiating first light to a first exposure area of a first unit pixel area, the first light being inclined at a first angle with respect to the substrate in a first direction, and substantially simultaneously photoaligning the photosensitive polymer layer by irradiating second light to a second exposure area of a second unit pixel area at substantially the same time as the first light is irradiated to the first exposure area, the second light being inclined at a second angle with respect to the substrate in a second direction.

In one exemplary embodiment of the present invention, a mask is disposed over the substrate, wherein the mask includes; a first mask part which exposes the first exposure area of the first unit pixel area to the first light, and which blocks the second exposure area of the first unit pixel area, and a second mask part which blocks the first exposure area of the second unit pixel area, and which exposes the second exposure area of the second unit pixel area to the second light.

In some exemplary embodiments of the present invention, the first light and the second light may be irradiated to each of the unit pixel areas, so that the photosensitive polymer layer in the first exposure area of each unit pixel area is pretilted in the first direction and the photosensitive polymer layer in the second exposure area of each unit pixel area is pretilted in the second direction.

In one exemplary embodiment, a direction of travel of photons comprising the first light may be substantially opposite to a direction of travel of photons comprising the second light. In one exemplary embodiment, at least one of the exposure energy of the first light, an exposure energy of the second light, the first angle and the second angle may be adjusted to control a magnitude of a photoalignment of the photosensitive polymer layer.

In one exemplary embodiment, the mask may further include a blocking layer which is disposed between the first mask part and the second mask part and which prevents interference between the first light and the second light.

In one exemplary embodiment, the first mask part and the second mask part may be separated from each other, and separately controlled.

In one exemplary embodiment of the present invention, the method may further comprise polarizing an unpolarized ultraviolet light to form the first light and polarizing the unpolarized ultraviolet light to form the second light. In one exemplary embodiment, a first polarization plate may be disposed in a first pathway of the unpolarized ultraviolet light to form the first light, and a second polarization plate may be disposed in a second pathway of the unpolarized ultraviolet light to form the second light. In one exemplary embodiment, the polarization axis of the first light may be substantially parallel with the polarization axis of the second light.

In one exemplary embodiment of the present invention, unpolarized ultraviolet light may pass through a beam splitter to be divided into s-polarized light and p-polarized light, wherein the first light includes the s-polarized light, and the second light includes the p-polarized light which has passed through a ½ wavelength phase-difference plate.

In accordance with another exemplary embodiment of the present invention, an apparatus for forming an alignment layer includes a light source which emits light, a first optical transport system which guides the light and which irradiates first light to a first exposure area of a first unit pixel area defined on a substrate to firstly photoalign a photosensitive polymer layer disposed on the substrate, the first light being inclined at a first angle with respect to the substrate in a first direction, and a second optical transport system which guides the light and which irradiates second light to a second exposure area of a second unit pixel area at substantially the same time as the first light is irradiated to the first exposure area of the first unit pixel to photoalign the photosensitive polymer layer, the second light being inclined at a second angle with respect to the substrate in a second direction.

In some exemplary embodiments of the present invention, the apparatus may further include a mask which includes; a first mask part which exposes the first exposure area of the first unit pixel area to the first light, and which blocks the second exposure area of the first unit pixel area, and the second mask part may block the first exposure area of the second unit pixel area, and expose the second exposure area of the second unit pixel area to the second light. In one exemplary embodiment, the first optical transport system may include a first reflective plate guiding the light and a first polarization plate polarizing the light, and the second optical transport system may include a second reflective plate guiding the light and a second polarization plate polarizing the light. In one exemplary embodiment, the mask may further include a blocking layer disposed between the first mask part and the second mask part, wherein the blocking layer prevents interference between the first light and the second light. In one exemplary embodiment, the first mask part and the second mask part may be separated from each other, and separately controlled. In one exemplary embodiment, a polarization axis of the first polarization plate is substantially parallel with a polarization axis of the second light.

In some exemplary embodiments of the present invention, the apparatus may further include a beam-splitting system which divides the light emitted from the light source into s-polarized light transmitted to the first optical transport system and p-polarized light transmitted to the second optical transport system, the polarization axis of the p-polarized light may be substantially perpendicular to the polarization axis of the s-polarized light. In one exemplary embodiment, the first optical transport system may include a first reflective plate which reflects the s-polarized light to provide the first light, and the second optical transport system may include; a second reflective plate which reflects the p-polarized light toward a direction inclined at the second angle with respect to the second direction, and a ½ wavelength phase-difference plate which converts the p-polarized light reflected by the second reflective plate to an s-polarized light and which transmits the s-polarized light as the second light.

According to some exemplary embodiments of the present invention, the number of steps for forming a photoalignment layer for forming a multi-domain structure may be considerably reduced, so that productivity may be improved.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on," "connected to" or "coupled to" another element, it can be directly on, connected or coupled to the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Example Embodiment 1

Figure 1:
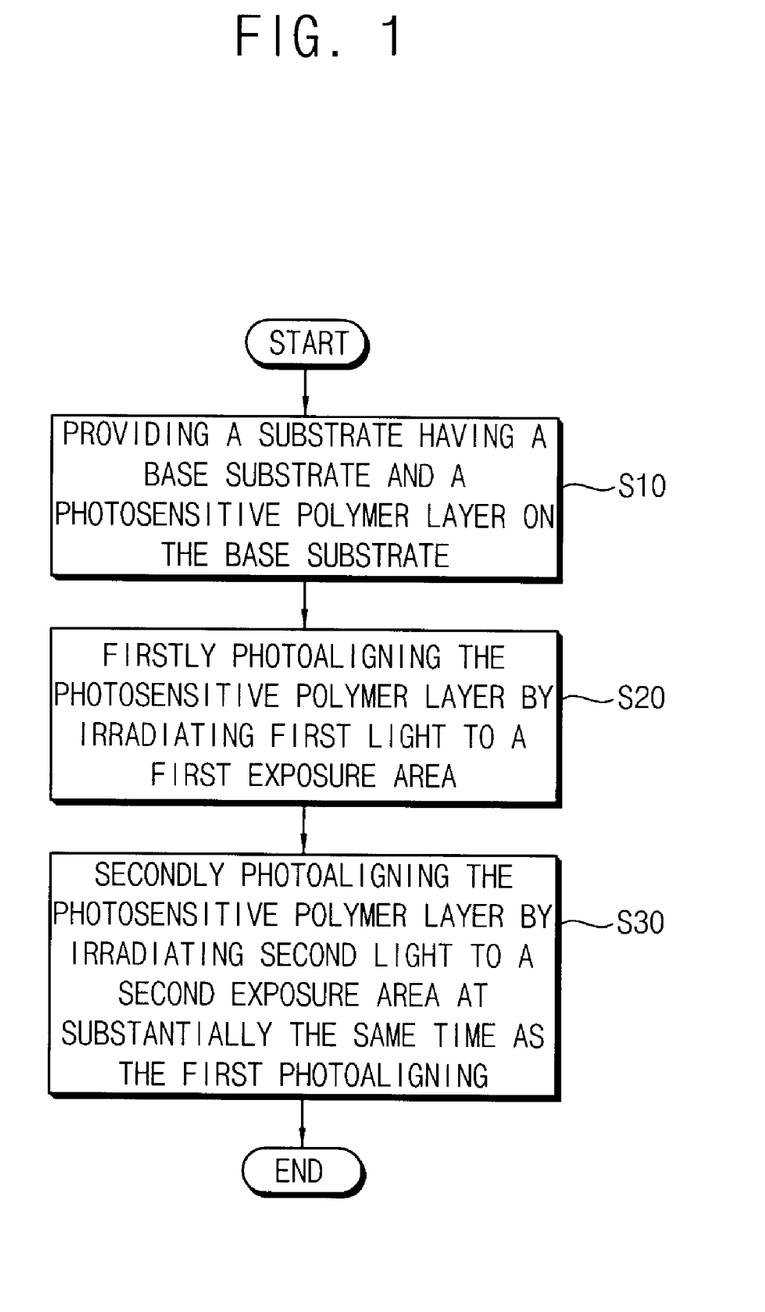
FIG. 1 is a flowchart of an exemplary embodiment of a method of forming an alignment layer in accordance with Example Embodiment 1 of the present invention.
Figure 2:
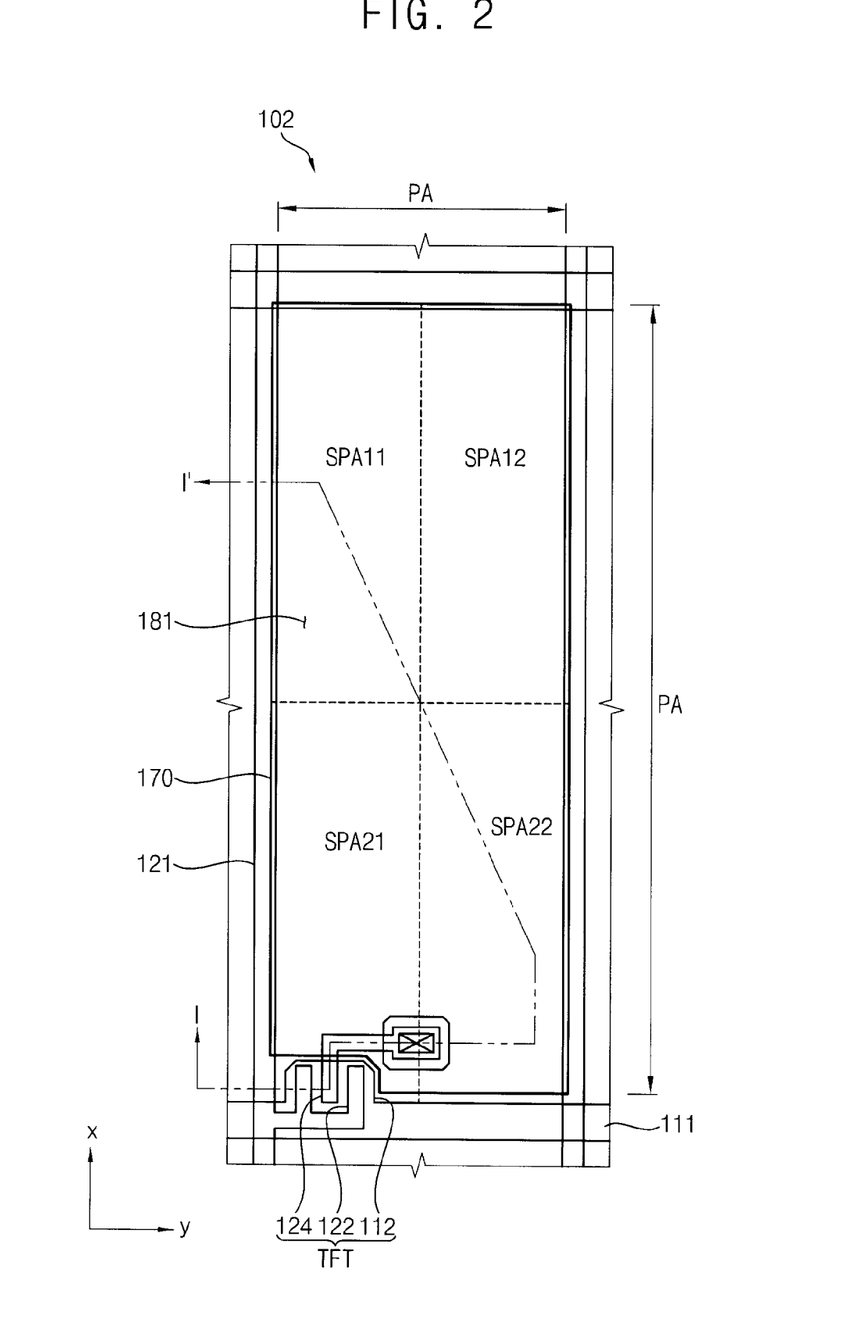
FIG. 2 is a top plan layout view illustrating a unit pixel area of a substrate formed by the method described with reference to FIG. 1.

FIG. 1 is a flowchart of an exemplary embodiment of a method of forming an alignment layer in accordance with Example Embodiment 1 of the present invention. FIG. 2 is a top plan layout view illustrating a unit pixel area of a substrate formed by the method described with reference to FIG. 1.

Referring to FIG. 1, according to an exemplary embodiment of the method of forming an alignment layer in accordance with Example Embodiment 1, a substrate 102 is prepared (step S10). The substrate 102 may be a substrate which is substantially completed except for a photoalignment process for forming an alignment layer. Hereinafter, the substrate 102 is referred to as "lower substrate."

In one exemplary embodiment, the lower substrate 102 may be a thin film transistor ("TFT") substrate wherein pixels are driven by an active matrix driving method using a switching element. In one exemplary embodiment, the lower substrate 102 may have a substantially rectangular shape. In the exemplary embodiment wherein the lower substrate 102 has a substantially rectangular shape, a first direction (x) represents a longitudinal direction of the lower substrate, and a second direction (y) represents a horizontal direction of the lower substrate as shown in FIG. 2.

Referring to FIG. 2, the lower substrate 102 includes a lower base substrate (not shown), a pixel electrode 170 and a lower photosensitive polymer layer 181.

A plurality of unit pixel areas PA is defined on the lower substrate in a matrix formation. The unit pixel area PA includes an individual area where liquid crystal molecules of a liquid crystal display ("LCD") apparatus are independently controlled.

The unit pixel area PA may be divided into a plurality of unit sub-pixel areas that are also arranged in a matrix formation. In FIG. 2, the unit pixel area PA is divided into four unit sub-pixel areas including a unit sub-pixel area SPA11 arranged in row 1, column 1 (hereinafter referred to as "row 1-column 1 unit sub-pixel area"), a unit sub-pixel area SPA12 arranged in row 1, column 2 (hereinafter referred to as "row 1-column 2 unit sub-pixel area"), a unit sub-pixel area SPA21 arranged in row 2, column 1 (hereinafter referred to as "row 2-column 1 unit sub-pixel area") and a unit sub-pixel area SPA22 arranged in row 2, column 2 (hereinafter referred to as "row 2-column 2 unit sub-pixel area"). In the exemplary embodiment of Example Embodiment 1, the unit pixel area PA has a substantially rectangular shape, but the unit pixel area PA may have various shapes such as a V-shape, a Z-shape, etc.

A plurality of gate lines 111, a plurality of data lines 121 and a TFT are formed on the lower base substrate. The TFT includes a gate electrode 112 connected to the gate line 111 and a source electrode 122 connected to the data line 121. The pixel electrode 170 includes a transparent conductive material, exemplary embodiments of which include indium tin oxide ("ITO"), indium zinc oxide ("IZO"), and other materials having similar characteristics. The transparent conductive material is deposited on the lower substrate and patterned to form the pixel electrode 170. The pixel electrode 170 is connected to a drain electrode 124 of the TFT.

In one exemplary embodiment, the lower photosensitive polymer layer 181 may include a photosensitive polymer based on cinnamate. In one such exemplary embodiment, a blend of a photosensitive polymer based on cinnamate and a polymer based on polyimide is coated over the pixel electrode 170 and cured to form the lower photosensitive polymer layer 181.

In one exemplary embodiment, the photosensitive polymer based on cinnamate and the polymer based on polyimide are blended in the weight ratio of 1:9 to 9:1 and dissolved in an organic solvent. In one exemplary embodiment, the polymer dissolved in the organic solvent may be coated on the lower substrate 102 in a spin-coating method. The polymer layer coated on the lower substrate 102 is heated and cured to form the lower photosensitive polymer layer 181.

Figure 3:
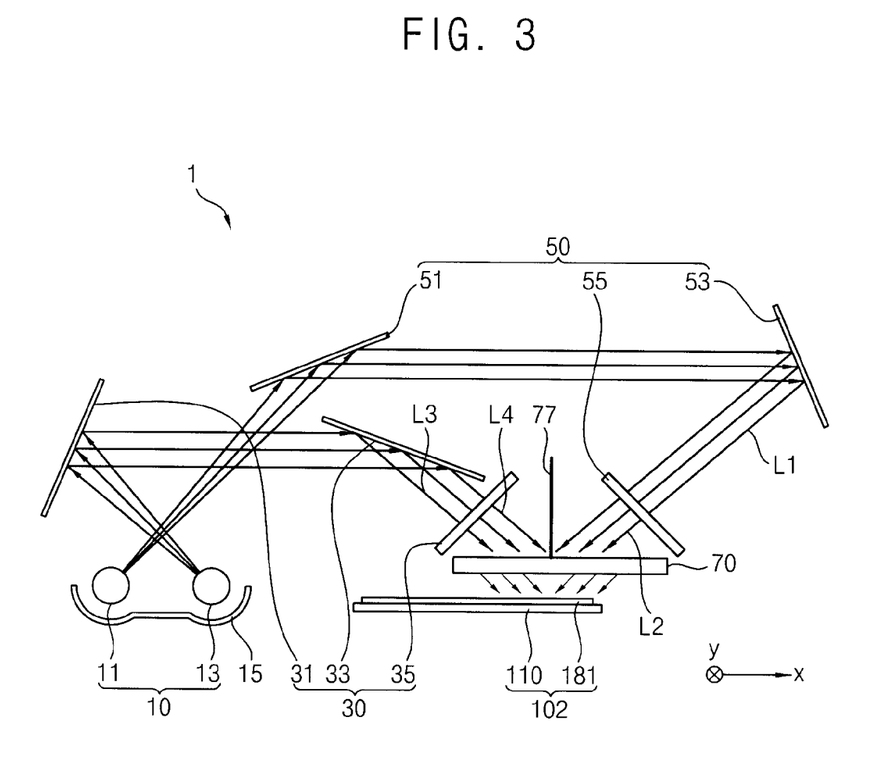
FIG. 3 is a schematic diagram illustrating an exemplary embodiment of an apparatus for forming an alignment layer using the method described with reference to FIG. 1.

FIG. 3 is a schematic diagram illustrating an exemplary embodiment of an apparatus for forming an alignment layer using the method described with reference to FIG. 1.

Referring to FIGS. 1 and 3, when the above-mentioned lower substrate 102 is provided, polarized first light L2 is irradiated to a first exposure area on the unit pixel area PA to firstly photoalign the lower photosensitive polymer layer 181 (step S20). The first light L2 is inclined at a first angle with respect to a virtual line parallel with the first direction (x) on the lower substrate 102.

At substantially the same time as the first photoalignment process, polarized second light L4 is irradiated to a second exposure area of another unit pixel area PA to secondly photoalign the lower photosensitive polymer layer 181 (step S30). The second light L4 is inclined at a second angle with respect to a virtual line parallel with an opposite direction of the first direction (x) on the lower substrate 102.

The first exposure area and the second exposure area are defined as areas where each alignment direction is determined by a single scan process that uses the exemplary embodiment of an apparatus 1 for forming an alignment layer shown in FIG. 3 to align the unit pixel area PA. That is, the first exposure area or the second exposure area may each include at least one of the unit sub-pixel areas SPA11, SPA12, SPA21 and SPA22.

In one exemplary embodiment, the first exposure area includes the row 1-column 1 unit sub-pixel area SPA11 and the row 2-column 1 unit sub-pixel area SPA21. The second exposure area includes the row 1-column 2 unit sub-pixel area SPA12 and the row 2-column 2 unit sub-pixel area SPA22. Therefore, the row 1-column 1 unit sub-pixel area SPA11 and the row 2-column 1 unit sub-pixel area SPA21 are exposed to only one of the polarized first light L2 and the polarized second light L4 and the row 1-column 2 unit sub-pixel area SPA12 and the row 2-column 2 unit sub-pixel area SPA22 are exposed to the other of the polarized first light L2 and the polarized second light L4.

The first photoalignment process and the secondary photoalignment process may be simultaneously performed by a single scan process wherein the substrate 102 is moved through a photoalignment apparatus only a single time. The exemplary embodiment of an apparatus 1 for forming an alignment layer includes a light source 10, a first optical transport system 50 and a second optical transport system 30 as shown in FIG. 3.

Exemplary embodiments of the light source 10 may include an ultraviolet lamp irradiating ultraviolet light. In one exemplary embodiment, the light source 10 may include a first ultraviolet lamp 11 and a second ultraviolet lamp 13. The ultraviolet light emitted from the first and second ultraviolet lamps 11 and 13 is unpolarized light. The light from the light source 10 may be reflected in a desired direction by a reflector 15.

The first and the second optical transport system 50 and 30 guide the ultraviolet light emitted from the light source 10, so that the ultraviolet light is irradiated to the lower photosensitive polymer layer 181 of the lower substrate 102 to optically align the lower photosensitive polymer layer 181.

A plurality of photosensitive polymer chains is formed on a surface of the lower photosensitive polymer layer 181. The polymer chains include a double bond that makes the polymer chains have optical directionality. Since the polymer chains have optical directionality due to the double bond, the polymer chains may be photopolymerized with each other only when the ultraviolet light irradiated to the lower photosensitive polymer layer 181 has a particular directional polarization axis. As a result of the photopolymerization reaction, the polymer chains tilt toward the incident direction of the polarized ultraviolet light so that the alignment layer has a pretilt angle. Thereby, the pretilt direction of the polymers, and therefore also the alignment layer, may be influenced by the incident direction of the polarized ultraviolet light.

Figure 5:
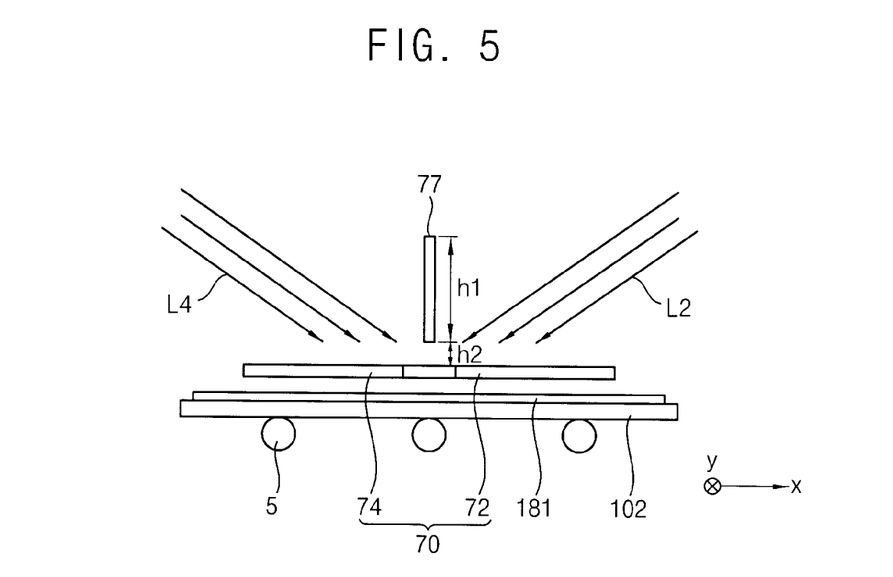
FIG. 5 is a side view illustrating a blocking layer and an incident angle of light proceeding to the mask.

The first optical transport system 50 irradiates the polarized first light L2 to the first exposure area of the unit pixel area PA. The first optical transport system 50 may include a first reflective plate 51, a second reflective plate 53 and a first polarization plate 55. The first reflective plate 51 reflects a first ultraviolet light L1 emitted from the first ultraviolet lamp 11 toward the second reflective plate 53. The second reflective plate 53 reflects the first ultraviolet light L1 toward the first polarization plate 55. The first ultraviolet light L1 reflected by the second reflective plate 53 is irradiated to the substrate 102 through a mask 70 at the first angle with respect to the lower substrate 102 in the opposite direction of the first direction (x) in which the lower substrate 102 is transferred through the exemplary embodiment of the apparatus 1 by a series of rollers 5 as shown in FIG. 5. In one exemplary embodiment, the rollers move the substrate 102 along the x-direction and through the apparatus 1.

The first polarization plate 55 is disposed substantially perpendicular to an irradiating direction of the first ultraviolet light L1. The first polarization plate 55 converts the first ultraviolet light L1 to the polarized first light L2, and guides the polarized first light L2 to the first exposure area.

The second optical transport system 30 irradiates the polarized second light L4 to the second exposure area of another unit pixel area PA, at substantially the same time as the irradiation of the polarized first light L2.

The second optical transport system 30 may include a third reflective plate 31, a fourth reflective plate 33 and a second polarization plate 35. The third reflective plate 31 reflects a second ultraviolet light L3 emitted from the second ultraviolet lamp 13 toward the fourth reflective plate 33 as shown in FIG. 3. The fourth reflective plate 33 reflects the second ultraviolet light L3 toward the fourth reflective plate 33. The second ultraviolet light L3 reflected by the fourth reflective plate 33 is irradiated to the substrate 102 through the mask 70 at the second angle with respect to the lower substrate 102 in the first direction (x) in which direction the lower substrate 102 is transferred through the exemplary embodiment of the apparatus 1.

The second polarization plate 35 is disposed to be substantially perpendicular to an irradiating direction of the second ultraviolet light L3. The second polarization plate 35 converts the second ultraviolet light L3 to the polarized second light L4, and guides the polarized second light L4 to the second exposure area.

The polarization axis of the polarized first light L2 and the polarization axis of the polarized second light L4 that are projected to the lower substrate 102 may be substantially parallel with each other.

Figure 4:
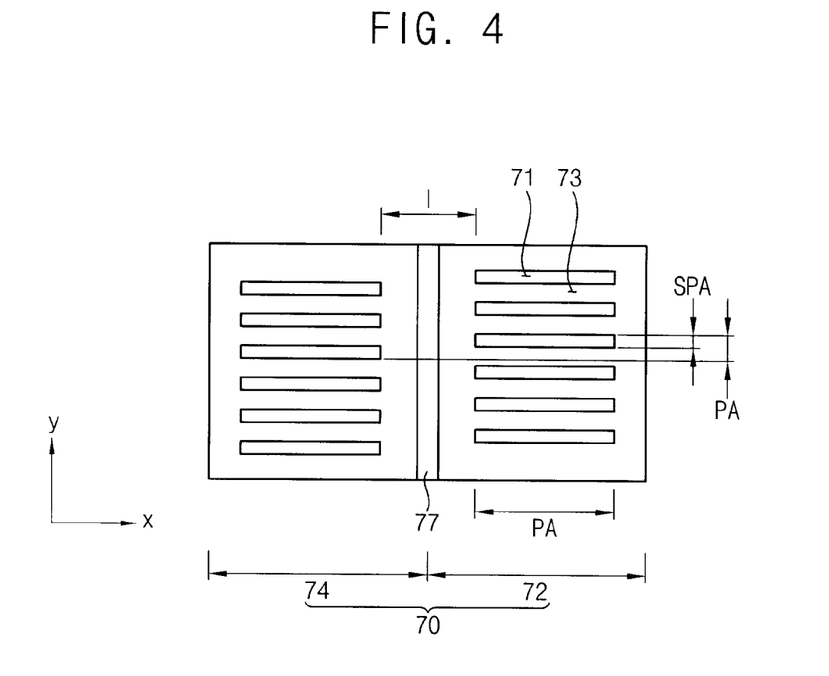
FIG. 4 is a top plan view illustrating the mask shown in FIG. 3.
Figure 6:
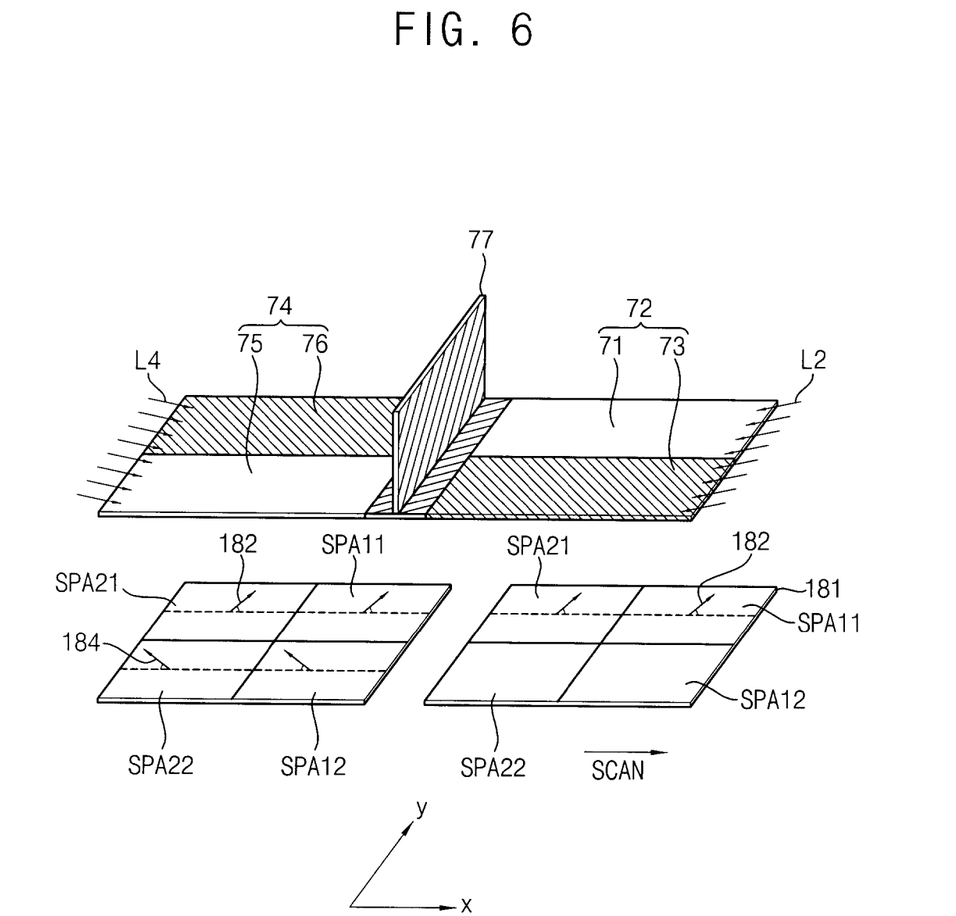
FIG. 6 is a front perspective view illustrating an exemplary embodiment of a photoalignment process applied to an exposure area.

FIG. 4 is a top plan view illustrating the mask shown in FIG. 3. FIG. 5 is a side view illustrating a blocking layer 77 and an incident angle of light proceeding to the mask 70. FIG. 6 is a front perspective view illustrating an exemplary embodiment of a photoalignment process applied to an exposure area.

Referring to FIGS. 4, 5 and 6, the exemplary embodiment of a method of forming an alignment layer in accordance with the present invention may further include a step of disposing a mask 70 over the lower substrate 102. A first unit pixel area and a second unit pixel area are defined as unit pixel areas adjacent to each other in the first direction (x). The mask 70 exposes the first exposure area of the first unit pixel area PA to the polarized first light L2, and blocks the second exposure area of the first unit pixel area PA. Further, the mask 70 may block the first exposure area of the second unit pixel area PA, and expose the second exposure area of the second unit pixel area PA to the polarized second light L4.

Meanwhile, the mask 70 may include a first mask part 72 and a second mask part 74. In one exemplary embodiment, the first mask part 72 and the second mask part 74 may be integrally formed. That is, the mask 70 may be a single, solitary and indivisible unitary unit. A blocking layer 77 may be installed between the first mask part 72 and the second mask part 74 to prevent the first light L2 and the second light L4 from interfering with each other. A transmission portion 71 and a blocking portion 73 are formed at the first mask part 72. In one exemplary embodiment, the size of the transmission portion 71 may be substantially the same as that of the first exposure area. The second mask part 74 may include a transmission portion 75 and a blocking portion 76 that alternate with those of the first mask part 72. Alternative exemplary embodiments include configurations wherein the mask 70 may be omitted.

Figure 7:
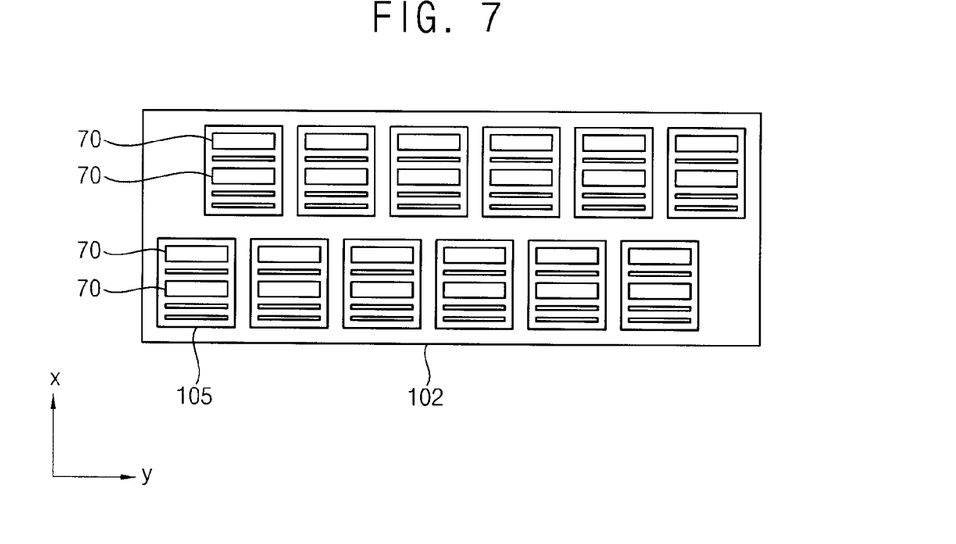
FIG. 7 is a top plan view illustrating a process of forming an alignment layer on a large-sized lower substrate by the apparatus shown in FIG. 3.

FIG. 7 is a top plan view illustrating a process of forming an alignment layer on a large-sized lower substrate 102 by the apparatus shown in FIG. 3.

Referring to FIG. 7, a plurality of exposure areas 105 is defined on a large-sized lower substrate 102. A plurality of masks 70 is disposed at the plurality of exposure areas 105. In one exemplary embodiment, two masks are disposed at each of the plurality of exposure areas 105.

When the polarized first light L2 and the polarized second light L4 are scanned at each of the exposure areas 105 in a scan direction (e.g., the x-direction), the first exposure area and the second exposure area of one unit pixel area PA are successively photoaligned. The alignment direction of the first exposure area and the second exposure area are substantially opposite to each other.

According to the exemplary embodiment of a method of forming an alignment layer and the exemplary embodiment of an apparatus 1 for performing the method in accordance with the present invention, the lower photosensitive polymer layer 181 at the first exposure area and the second exposure area that are spatially divided in the unit pixel area PA is photoaligned to form two domains by a single scan process.

Exposure energies of the polarized first light L2 and the polarized second light L4 or the first angle and the second angle may be adjusted to control the magnitude of the photoalignment of the lower photosensitive polymer layer 181.

The blocking layer 77 illustrated in FIG. 6 may be installed between the first mask part 72 and the second mask part 74 to prevent the first light L2 and the second light L4 from interfering with each other.

Figure 8:
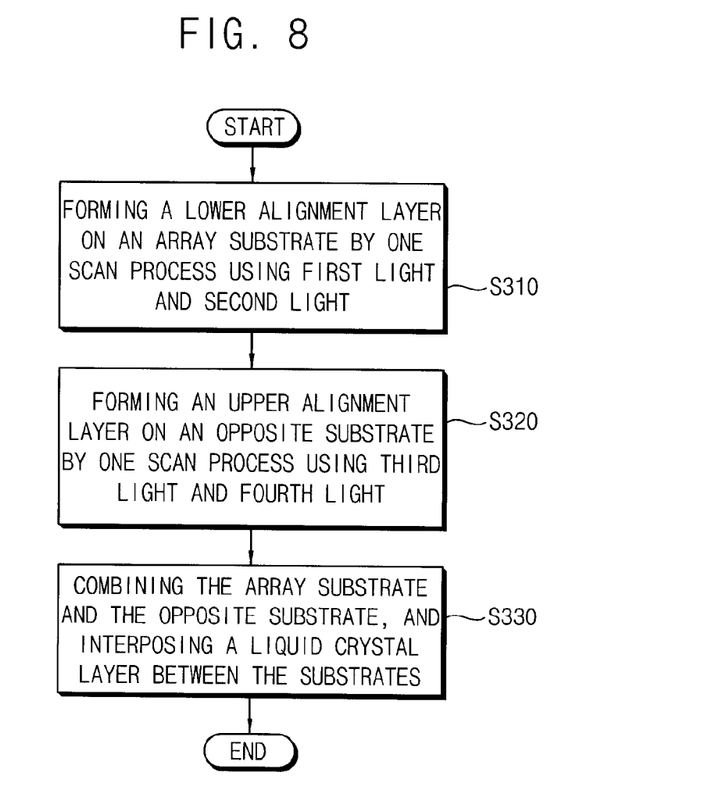
FIG. 8 is a flowchart describing an exemplary embodiment of a method of manufacturing an exemplary embodiment of a liquid crystal display ("LCD") apparatus using the exemplary embodiment of a method of forming an alignment layer shown in FIGS. 1 to 7.
Figure 9:
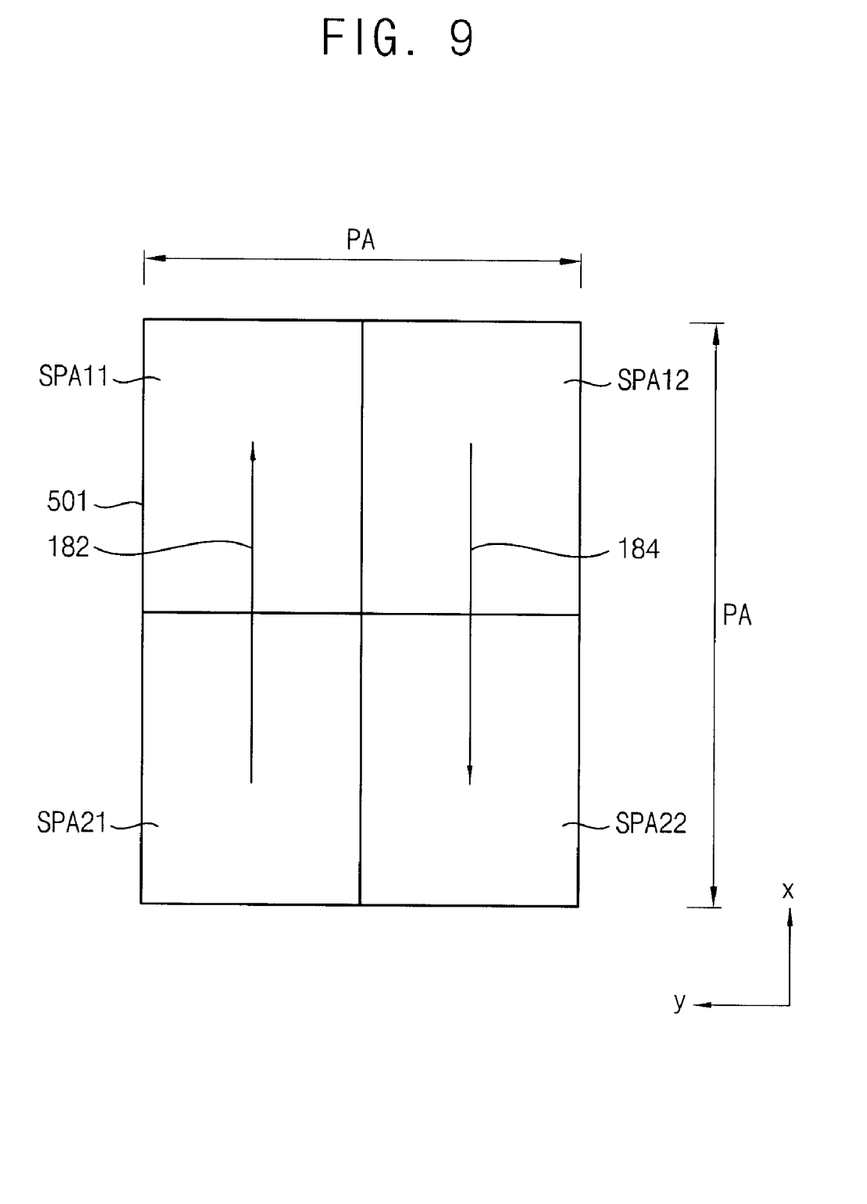
FIG. 9 is a top plan view illustrating pretilt directions of an array substrate on which an alignment layer is formed by the process shown in FIGS. 6, 7 and 8.

FIG. 8 is a flowchart describing an exemplary embodiment of a method of manufacturing an exemplary embodiment of an LCD apparatus using the exemplary embodiment of a method of forming an alignment layer shown in FIGS. 1 to 7. FIG. 9 is a top plan view illustrating photoalignment directions of an array substrate on which an alignment layer is formed by the process shown in FIGS. 6, 7 and 8.

Referring to FIGS. 6, 7, 8 and 9, an array substrate 101 is manufactured using the previously described exemplary embodiment of a method of forming an alignment layer (step S310). According to the present invention, the lower substrate 102 illustrated in FIG. 2 may be treated by the method of forming an alignment layer shown in FIGS. 1 to 7, to manufacture the array substrate 101.

That is, the lower photosensitive polymer layer 181 in the first exposure area and the second exposure area of the unit pixel area PA is photoaligned in the first direction (x) and the opposite direction of the first direction (x), respectively, by a single scan process using the polarized first light L2 and the polarized second light L4 as described above, so that a lower alignment is formed on the array substrate 101. For example, the row1-column1 unit sub-pixel area SPA11 and the row2-column1 unit sub-pixel area SPA21 may be both aligned in a first photoalignment direction 182 substantially parallel the x-axis as shown in FIG. 9. Similarly, the row1-column2 unit sub-pixel area SPA12 and the row2-column2 unit sub-pixel area SPA22 may be both aligned in a second photoalignment direction 184 substantially parallel the x-axis and substantially opposite the first photoalignment direction 182 as shown in FIG. 9.

Figure 10:
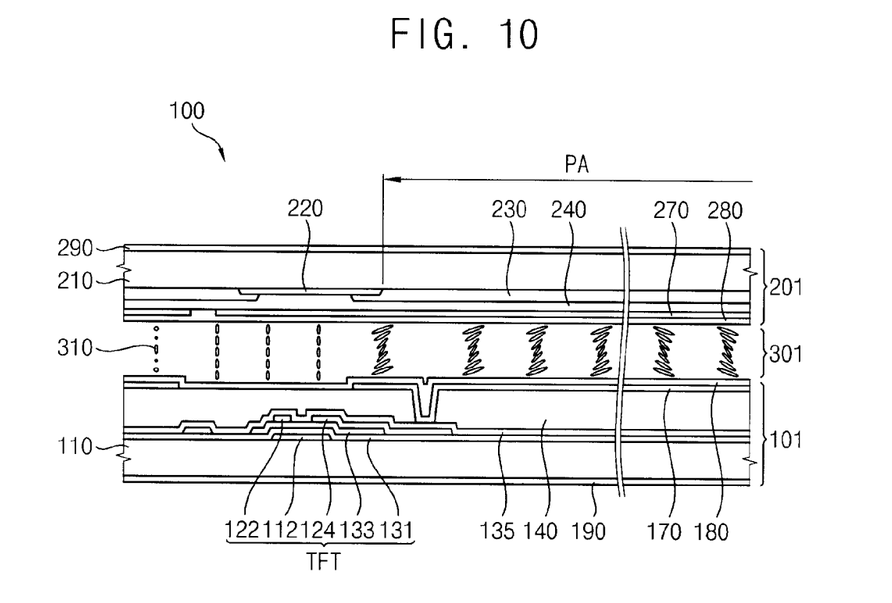
FIG. 10 is a cross-sectional view of the exemplary embodiment of an LCD apparatus taken along lines I-I' in FIG. 2.
Figure 11:
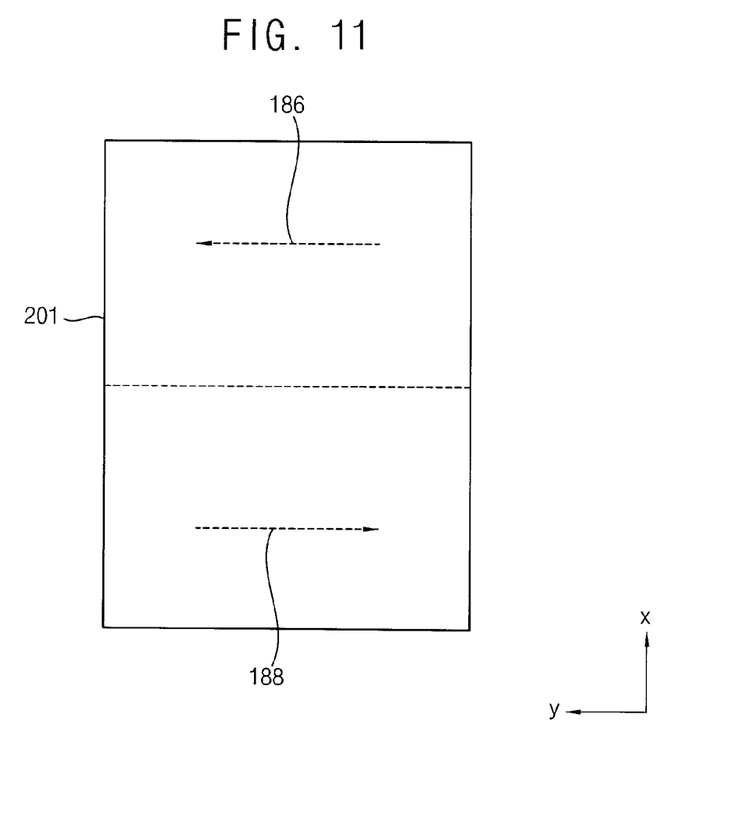
FIG. 11 is a top plan view illustrating an alignment direction of an opposite substrate on which an upper alignment layer is formed by the exemplary embodiment of a photoalignment process shown in FIGS. 1 to 7.

FIG. 10 is a cross-sectional view of the exemplary embodiment of an LCD apparatus taken along lines I-I' in FIG. 2. FIG. 11 is a top plan view illustrating an alignment direction of an opposite substrate on which an upper alignment layer is formed by the exemplary embodiment of a photoalignment process shown in FIGS. 1 to 7.

Referring to FIGS. 10 and 11, an upper photosensitive polymer layer in a third exposure area and a fourth exposure area of the unit pixel area PA is photoaligned in a third direction and a fourth direction by a single scan process using polarized third light and polarized fourth light according to the exemplary embodiment of a method of forming an alignment layer shown in FIGS. 1 to 7, to form an upper alignment layer 280, so that an opposite substrate 201 having the upper alignment layer 280 is manufactured (step S320).

Here, a third photoalignment direction 186 and a fourth photoalignment direction 188 are substantially opposite to each other, and each of the third photoalignment direction 186 and the fourth photoalignment direction 188 are substantially perpendicular to the first photoalignment direction 182 and the second photoalignment direction 184. The polarized third light is inclined at a third angle with respect to the third photoalignment direction 186, and the polarized fourth light is inclined at a fourth angle with respect to the fourth photoalignment direction 188.

In this example embodiment, the opposite substrate 201 may include an upper base substrate 210, a blocking pattern 220, a color filter pattern 230, an overcoat layer 240, a common electrode layer 270 and an upper alignment layer 280.

In one exemplary embodiment, the blocking pattern 220 is formed on the upper base substrate 210, correspondingly to the gate line 111, the data line 121 and the TFT.

The color filter pattern 230 is formed on the upper base substrate 210 and in an area corresponding to the unit pixel area PA. In one exemplary embodiment, the color filter pattern 230 may include color filters such as a red color filter, a green color filter, a blue color filter, etc. In one exemplary embodiment, the red color filter, the green color filter and the blue color filter may be subsequently disposed at each of the unit pixel area PA in the second direction (y).

The overcoat layer 240 covers the color filter pattern 230 and the blocking pattern 220. The common electrode layer 270 is formed on the overcoat layer 240.

The upper alignment layer 280 is formed on the common electrode layer 270.

Figure 12:
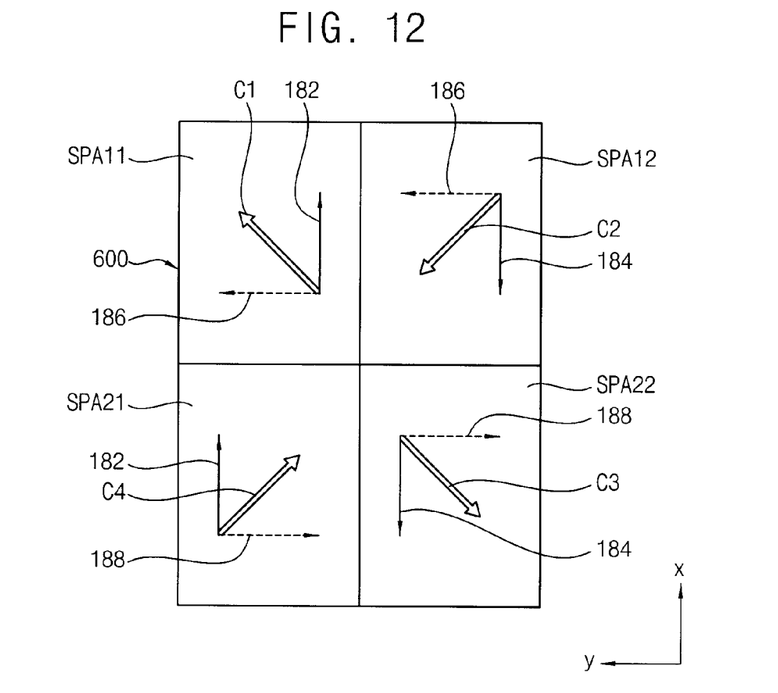
FIG. 12 is a top plan view illustrating an exemplary embodiment of an LCD apparatus including a combination of the array substrate shown in FIG. 9 and the opposite substrate shown in FIG. 11.

FIG. 12 is a top plan view illustrating an exemplary embodiment of an LCD apparatus including a combination of the array substrate shown in FIG. 9 and the opposite substrate shown in FIG. 11.

Referring to FIGS. 10 and 12, the array substrate 101 and the opposite substrate 201 are combined, and liquid crystal molecules are interposed between the two substrates 101 and 201 to form the liquid crystal layer 301, so that the exemplary embodiment of an LCD apparatus 100 is manufactured (step S330).

In one exemplary embodiment, lower photoalignment directions 182 and 184 of a lower alignment layer 180 may be substantially perpendicular to upper photoalignment directions 186 and 188 of the upper alignment layer 280 in the unit sub-pixel areas SPA11, SPA12, SPA21 and SPA22, as shown in FIG. 12.

Alignment directions C1, C2, C3 and C4 of each unit sub-pixel area are defined as directions corresponding to vector sums of the lower photoalignment directions 182 and 184 and the upper photoalignment directions 186 and 188. The alignment directions C1, C2, C3 and C4 are different from each other in each of the unit sub-pixel areas SPA11, SPA12, SPA21 and SPA22, and thus four domains are formed.

The alignment directions C1 and C3 diverge from the center of the unit pixel area PA in the unit sub-pixel areas SPA11 and SPA22 that are diagonally disposed in the unit pixel area PA. The alignment directions C1 and C3 are opposite to each other. The alignment directions C2 and C4 converge on the center of the unit pixel area PA in the unit sub-pixel areas SPA12 and SPA21 that are diagonally disposed in the unit pixel area PA. The alignment directions C2 and C4 are opposite to each other.

The method of determining the photoalignment directions of the lower alignment layer 180 and the upper alignment layer 280 may be variously modified according to alternative exemplary embodiments of a method of forming a multi-domain structure.

Referring back to FIG. 10, in one exemplary embodiment, when an electric field is not applied to the liquid crystal layer 301, the liquid crystal molecules 310 interposed between the array substrate 101 and the opposite substrate 201 may be vertically aligned. That is, the LCD apparatus 100 may be operated in a vertical alignment mode.

The liquid crystal molecules 310 are inclined at a pretilt angle in the lower photoalignment directions 182 and 184 on a surface of the lower alignment layer 180, and are inclined at a pretilt angle in the upper photoalignment directions 186 and 188 on a surface of the upper alignment layer 280.

In one exemplary embodiment, a lower polarization plate 190 may be disposed at a rear surface of the array substrate 101, and an upper polarization plate 290 may be disposed at an upper surface of the opposite substrate 201. In one such exemplary embodiment, the polarization axes of the lower polarization plate 190 and the upper polarization plate 290 may be substantially perpendicular to each other. In such an exemplary embodiment, the alignment directions C1, C2, C3 and C4 are determined so that the liquid crystal molecules 310 are aligned at approximately 45 degrees with respect to the polarization axes.

Example Embodiment 2

Figure 13:
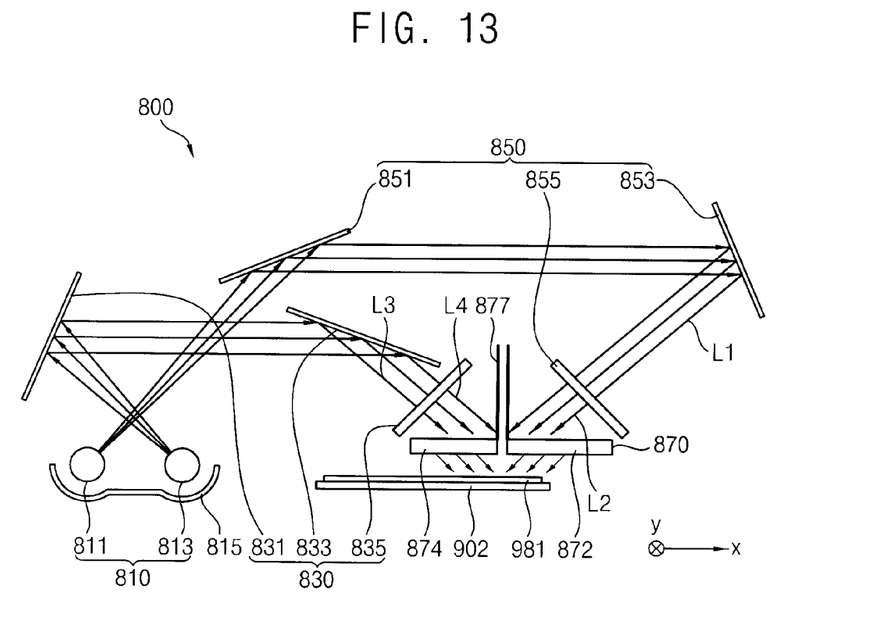
FIG. 13 is a schematic diagram illustrating an exemplary embodiment of an apparatus for forming an alignment layer in accordance with Example Embodiment 2.

FIG. 13 is a schematic diagram illustrating an exemplary embodiment of an apparatus for forming an alignment layer in accordance with Example Embodiment 2.

An exemplary embodiment of a method of forming an alignment layer and an exemplary embodiment of a method of manufacturing an exemplary embodiment of an LCD apparatus using the method are substantially the same as those shown in FIGS. 1 to 12. Therefore, repeated and detailed descriptions will be omitted.

An exemplary embodiment of an apparatus 800 for forming an alignment layer described with reference to FIG. 13 may be substantially similar to the exemplary embodiment of an apparatus 1 described with reference to FIGS. 1 to 7 except that a mask 870 is divided into two mask parts which may be separately controlled. Therefore, the same reference numbers are used for the same or similar elements, and any further descriptions concerning the same or similar elements as those shown in FIGS. 1 to 7 will be omitted.

Referring to FIG. 13, the mask 870 is divided into a first mask part 872 and a second mask part 874. The first mask part 872 and the second mask part 874 are sufficiently separated from each other so that first light L2 irradiated to a first exposure area and second light L4 irradiated to a second exposure area do not interfere with each other.

Further, an interval between a period for photoaligning the first exposure area by the first light L2 and a period for photoaligning the second exposure area by the second light L4 may be variously adjusted.

Example Embodiment 3

Figure 14:
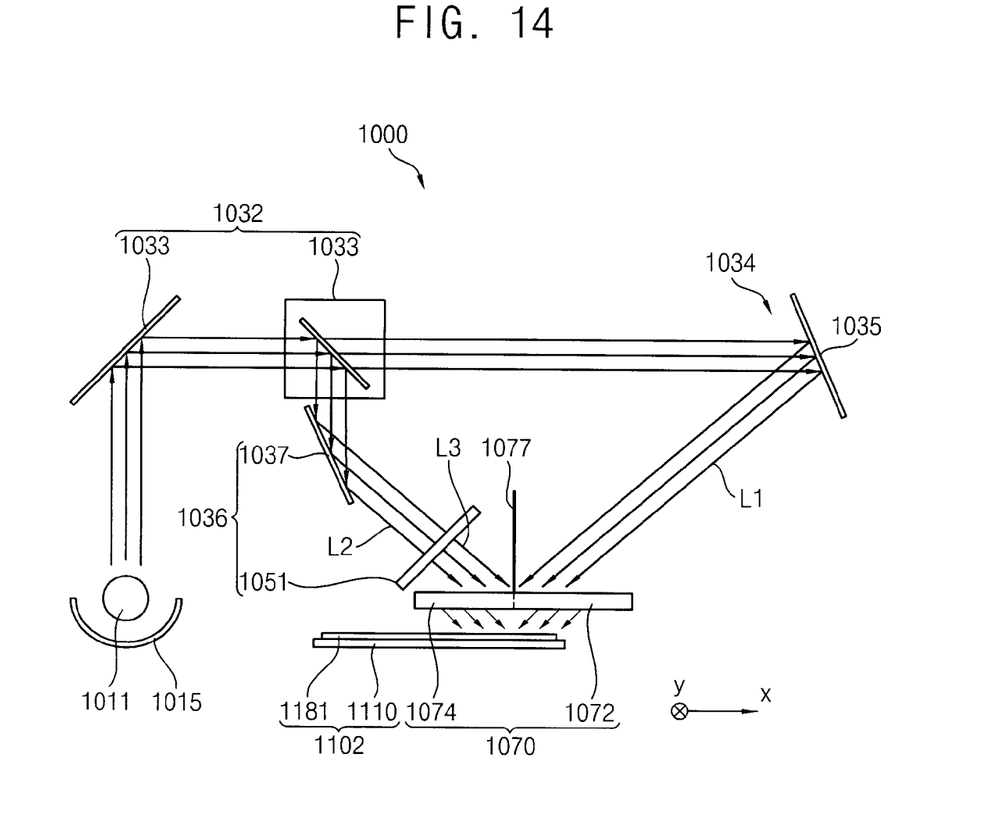
FIG. 14 is a schematic diagram illustrating an exemplary embodiment of an apparatus for forming an alignment layer in accordance with Example Embodiment 3.

FIG. 14 is a schematic diagram illustrating another exemplary embodiment of an apparatus for forming an alignment layer in accordance with Example Embodiment 3.

An exemplary embodiment of a method of forming an alignment layer and an exemplary embodiment of a method of manufacturing an exemplary embodiment of an LCD apparatus using the exemplary embodiment of a method are substantially the same as those shown in FIGS. 1 to 12. Therefore, repeated and detailed descriptions will be omitted.

Referring to FIG. 14, an exemplary embodiment of an apparatus 1000 for forming an alignment layer in accordance with this exemplary embodiment includes a light source, a first optical transport system 1034, a second optical transport system 1036 and a beam-splitting system 1032.

The light source is substantially the same as the light source 10 described with reference to the exemplary embodiment shown in FIG. 3 except that the light source includes a single ultraviolet lamp 1011.

The beam-splitting system 1032 includes a first reflective plate 1031 and a beam splitter 1033.

The first reflective plate 1031 reflects unpolarized ultraviolet light emitted from the ultraviolet lamp 1011 toward the beam splitter 1033. The beam splitter 1033 divides the unpolarized ultraviolet light into a first s-polarized light and p-polarized light whose polarization axis is substantially perpendicular to the polarization axis of the first s-polarized light.

The first optical transport system 1034 includes a second reflective plate 1035. The second reflective plate 1035 reflects the first s-polarized light. First light L1 is defined as the first s-polarized light reflected by the second reflective plate 1035. The first light L1 proceeds to a substrate 1102 at a first angle with respect to the first direction (x). The first light L1 is irradiated to a lower photosensitive polymer layer 1181 in a first exposure area of a first unit pixel area PA through a first mask part 1072. Accordingly, the lower photosensitive polymer layer 1181 in the first exposure area is photoaligned in the first direction (x).

The second optical transport system 1036 may include a third reflective plate 1037 and a ½ wavelength phase-difference plate 1051. The third reflective plate 1037 reflects the p-polarized light. Second light L2 is defined as the p-polarized light reflected by the third reflective plate 1037. The second light L2 proceeds to the substrate 1102 at a second angle with respect to an opposite direction of the first direction (x), and passes through the ½ wavelength phase-difference plate 1051. The ½ wavelength phase-difference plate 1051 converts the second light L2 to a second s-polarized light L3. The second s-polarized light L3 is irradiated to the lower photosensitive polymer layer 1181 in the second exposure area through a second mask part 1074. Accordingly, the lower photosensitive polymer layer 1181 in the second exposure area is photoaligned in the opposite direction of the first direction (x).

The exemplary embodiment of an apparatus 1000 for forming an alignment layer may further include a transfer table for transferring the substrate 1102 in the first direction (x).

According to the exemplary embodiment of an apparatus 1000 in accordance with the present invention, an optical loss caused when a polarization plate is used may be prevented. In an apparatus for forming an alignment layer using a polarization plate, such as the exemplary embodiment of an apparatus 1 illustrated in FIG. 3, light except for p-polarized light or s-polarized light is lost when unpolarized ultraviolet light passes through the first polarization plate 55 and the second polarization plate 35. However, according to this exemplary embodiment, the apparatus 1000 may use substantially all of the light including the p-polarized light and s-polarized light emitted from the beam splitter 1033. Therefore, the optical efficiency of the apparatus 1000 for forming an alignment layer may be improved.

According to the present invention, a plurality of domains may be formed in an alignment layer in a unit pixel area by a single scan process. Therefore, the number of steps of a photoalignment process for forming a multi-domain structure may be reduced, so that productivity may be considerably improved. The present invention may be applied to an apparatus including an alignment layer.

The foregoing is illustrative of the present disclosure and is not to be construed as limiting thereof. Although a few example embodiments of the present invention have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures.

Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. Embodiments of the present invention are defined by the following claims, with equivalents of the claims to be included therein.

What is claimed is:

1. A method of forming an alignment layer, comprising:
providing a substrate having a base substrate and a photosensitive polymer layer disposed on the base substrate, the base substrate including a plurality of unit pixel areas, each of which is divided into a plurality of sub-pixel areas;
photoaligning the photosensitive polymer layer by irradiating first light to a first exposure area of a first unit pixel area, the first light being inclined at a first angle with respect to the substrate in a first direction; and
substantially simultaneously photoaligning the photosensitive polymer layer by irradiating second light to a second exposure area of a second unit pixel area at substantially the same time as the first light is irradiated to the first exposure area, the second light being inclined at a second angle with respect to the substrate in a second direction.

2. The method of claim 1, further comprising disposing a mask over the substrate,
wherein the mask includes:
a first mask part which exposes the first exposure area of the first unit pixel area to the first light, and which blocks the second exposure area of the first unit pixel area; and
a second mask part which blocks the first exposure area of the second unit pixel area, and which exposes the second exposure area of the second unit pixel area to the second light.

3. The method of claim 2, wherein the first light and the second light are irradiated to each of the unit pixel areas, so that the photosensitive polymer layer in the first exposure area of each unit pixel area is pretilted in the first direction and the photosensitive polymer layer in the second exposure area of each unit pixel area is pretilted in the second direction.

4. The method of claim 2, wherein a direction of travel of photons comprising the first light is substantially opposite to a direction of travel of photons comprising the second light.

5. The method of claim 4, wherein at least one of an exposure energy of the first light, an exposure energy of the second light, the first angle and the second angle is adjusted to control an amount of a photoalignment of the photosensitive polymer layer.

6. The method of claim 4, wherein the mask further includes a blocking layer which is disposed between the first mask part and the second mask part and which prevents interference between the first light and the second light.

7. The method of claim 4, wherein the first mask part and the second mask part are separated from each other, and independently controlled.

8. The method of claim 1, further comprising:
polarizing an unpolarized ultraviolet light to form the first light; and
polarizing the unpolarized ultraviolet light to form the second light.

9. The method of claim 8, wherein a first polarization plate is disposed in a first pathway of the unpolarized ultraviolet light to form the first light, and a second polarization plate is disposed in a second pathway of the unpolarized ultraviolet light to form the second light.

10. The method of claim 9, wherein a polarization axis of the first light is substantially parallel with a polarization axis of the second light.

11. The method of claim 8, wherein the unpolarized ultraviolet light passes through a beam splitter and is divided into s-polarized light and p-polarized light,
wherein the first light includes the s-polarized light, and the second light includes the p-polarized light which has passed through a ½ wavelength phase-difference plate.

12. An apparatus for forming an alignment layer, comprising:
a light source which emits light;
a first optical transport system which guides the light and which irradiates first light to a first exposure area of a first unit pixel area on a substrate to photoalign a photosensitive polymer layer disposed on the substrate, the first light being inclined at a first angle with respect to the substrate in a first direction; and
a second optical transport system which guides the light and which irradiates second light to a second exposure area of a second unit pixel area at substantially the same time as the first light is irradiated to the first exposure area of the first unit pixel to photoalign the photosensitive polymer layer, the second light being inclined at a second angle with respect to the substrate in a second direction.

13. The apparatus of claim 12, further comprising a mask which includes:
a first mask part which exposes the first exposure area of the first unit pixel area to the first light, and which blocks the second exposure area of the first unit pixel area; and
a second mask part which blocks the first exposure area of the second unit pixel area, and which exposes the second exposure area of the second unit pixel area to the second light.

14. The apparatus of claim 13, wherein the first optical transport system includes a first reflective plate which guides the light and a first polarization plate which polarizes the light, and
the second optical transport system includes a second reflective plate which guides the light and a second polarization plate which polarizes the light.

15. The apparatus of claim 14, wherein the mask further includes a blocking layer disposed between the first mask part and the second mask part, wherein the blocking layer prevents interference between the first light and the second light.

16. The apparatus of claim 14, wherein the first mask part and the second mask part are separated from each other, and independently controlled.

17. The apparatus of claim 14, wherein a polarization axis of the first light is substantially parallel with a polarization axis of the second light.

18. The apparatus of claim 13 further comprising a beam-splitting system which divides the light emitted from the light source into an s-polarized light transmitted to the first optical transport system and p-polarized light transmitted to the second optical transport system, the polarization axis of the p-polarized light being substantially perpendicular to the polarization axis of the s-polarized light.

19. The apparatus of claim 18, wherein the first optical transport system includes a first reflective plate which reflects the s-polarized light to form the first light, and
the second optical transport system includes:
a second reflective plate which reflects the p-polarized light toward a direction inclined at the second angle with respect to the second direction; and
a ½ wavelength phase-difference plate which converts the p-polarized light reflected from the second reflective plate to an s-polarized light and which transmits the s-polarized light as the second light.

* * * * *